(12) United States Patent
Raposa et al.

(10) Patent No.: US 6,563,302 B1
(45) Date of Patent: *May 13, 2003

(54) DEVICE FOR SENSING PROJECTILE VELOCITY IN AN UNDERWATER ENVIRONMENT

(75) Inventors: John R. Raposa; Daniel P. Thivierge, both of Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,243

(22) Filed: Apr. 28, 2000

(51) Int. Cl.$^7$ .................................................. G01P 3/66
(52) U.S. Cl. ....................................................... 324/179
(58) Field of Search ................................. 324/179, 178; 73/167; 346/38

(56) References Cited

U.S. PATENT DOCUMENTS 3,824,463 A * 7/1974 Oehler ........................ 324/179

* cited by examiner

Primary Examiner—Walter Snow
(74) Attorney, Agent, or Firm—Michael J. McGowan; James M. Kasischke; Prithvi C. Lall

(57) ABSTRACT

A device for sensing projectile velocity in an underwater environment is provided. The device includes a plurality of evenly spaced voltage coil members positioned in the path of a projectile. Each voltage coil member includes a support frame having an opening therein and a magnetic coil mounted on the support frame, and a sensing member connected to each support frame. The sensing member includes means for outputting a signal responsive to passage of the projectile through the voltage coil member, and a logic arrangement for determining a difference between passage of the projectile between adjacent ones of said plurality of voltage coil members throughout the run thereof, thereby determining a velocity of the projectile.

19 Claims, 3 Drawing Sheets

DEVICE FOR SENSING PROJECTILE VELOCITY IN AN UNDERWATER ENVIRONMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to an underwater high speed projectile speed sensing device for the adaptable high speed underwater munition (AHSUM) project. More particularly, the invention relates to a sensing circuit for providing a state output of wire coils used in the testing of an underwater projectile.

(2) Description of the Prior Art

The known Adaptable High Speed Underwater Munition (AHSUM) project needed a method to sense the speed of underwater projectiles during the course of their test series, and particularly a calculation of the velocity of a projectile traveling at high rates of speed in an underwater firing range.

Some of the unique aspects of testing an underwater projectile include the presence of a conducting medium and highly variable projectile paths caused by the liquid medium.

It is also desirable to measure the projectile's deceleration toward the end of the range.

The following patents, for example, disclose various types of voltage coils and velocity measuring systems, but do not disclose a device for sensing projectile velocity using a voltage coil and sensing circuit according to the aspects of the present invention.

U.S. Pat. No. 2,206,927 to Turnbull et al.;
U.S. Pat. No. 3,127,768 to Mason;
U.S. Pat. No. 3,659,201 to Vogelsang;
U.S. Pat. No. 3,824,463 to Oehler;
U.S. Pat. No. 4,845,690 to Oehler;
U.S. Pat. No. 4,483,190 to Cornett;
U.S. Pat. No. 4,649,796 to Schmidt; and
U.S. Pat. No. 5,233,901 to Nilsson et al.

Specifically, the patent to Turnbull et al discloses a device for detecting the emergence of a projectile from the muzzle of a gun barrel. More specifically, the device uses the electric charge found in the powder gasses and on the metallic parts of guns for changing the electrical potential of devices therein or connected thereto, and securing desired indicia therefrom.

The patent to Mason discloses an electronic method for obtaining velocity and pressure characteristics of firearms and of bullets or shells fired therefrom. The bullet fired from a gun is directed through the coils of at least two sensing members which have been connected to a high frequency oscillating circuit. A signal from the oscillating circuit is transmitted to gate means and from the gate means to a computer. A separate high frequency oscillating current is applied to the computer while simultaneously obtaining an amplified signal from a pressure transducer mounted on the rifle to a second computer, whereby signals obtained from the same rifle and the same explosion therefrom indicate velocity and pressure factors of the rifle bullet as fired from the rifle.

Vogelsang discloses an apparatus for measuring the muzzle velocity of a projectile which has a measuring system at the muzzle of the gun barrel. The measuring system has two relatively spaced coils though which the projectile passes for inducing two signal pulses. Means are provided for compensating for changes in the distance between the two coils due to variations of temperature including a temperature-dependent resistor and wherein the thermoelectric voltage measured across the resistor is used as a compensating voltage in an electronic compensating circuit. The electronic compensating circuit has a phase-inverting stage to which the signal pulses are to be applied wherein the output of the phase-inverting stage is connected to the input of a modified mono-stable multi-vibrator.

Oehler discloses a shot cluster velocity measuring apparatus in which the coils through which the shot is to sequentially pass are mounted in axially spaced relation and are electrically connected as frequency determining elements in a high frequency oscillator, the output of which is frequency modulated as the shot cluster passes the coils. An FM discriminator generates an amplitude varying signal representative of the frequency modulation. A differentiating and filtering circuit shapes the discriminator output which is then amplified. The gain of a variable gain amplifier is automatically adjusted to equalize signal amplitude, and a Schmitt trigger produces rectangular pulses. If the pulses out of the trigger are of sufficient duration they are used to produce "start" and "stop" signals, indicating the passage of the center of mass of the projectile or projectile cluster through the first and second coils, respectively. These signals are then used to control an interval timer which displays the count as a measure of velocity.

The patent to Cornett discloses a muzzle velocimeter having a pair of sensors positioned adjacent to the path of a projectile containing magnetic material wherein each of the sensors includes a permanent magnet having a wire coil wound thereon. The magnets provide magnetic fields which are disturbed by magnetic materials in a passing projectile causing each of the sensor coils to develop signal pulses. The distance between the sensor coils and the amount of time between the sensor coil pulses are used to calculate the velocity of the passing projectile. In an alternate embodiment a single sensor coil is used to sense the leading and tailing edges of a passing projectile and the projectile velocity calculated by using projectile length and passing time of the projectile.

The patent to Schmidt discloses a method and apparatus for setting a projectile fuse during muzzle exit. A transmitted coil concentrically mounted to the gun muzzle is utilized both to sense the presence of the projectile at the gun muzzle and to inductively transmit a radio frequency signal having a duration proportional to the fuse time delay value to a receiver coil disposed on the projectile. The transmitter coil is energized from a radio frequency oscillator before the projectile is fired. As the font end of the projectile begins to emerge from the gun muzzle, its presence is detected by a change in the transmitter coil impedance, and the transmitter coil is automatically de-energized. The receiver coil is spaced from the front end of the projectile so that it is not inductively coupled to the transmitter coil, the transmitter coil is re-energized from the oscillator for a time period proportional to the fuse time delay value to be set, then again de-energized until the projectile has completely emerged from the gun muzzle. The signal received by the receiver coil is processed by circuitry within the projectile to set the fuse time delay value.

The patent to Nilsson et al. discloses an apparatus for determining the roll angle of a rotating projectile shell, missile or the like as it leaves the barrel or launch tube which includes a magnetized part with a known polarization direction provided in the projectile, and two pairs of windings mounted at the very front of the muzzle bell of the barrel in such a way that a voltage is induced in the windings when the projectile passes the mouth, and an evaluation unit is designed to calculate, based on the voltage signals, the roll angle position of the projectile upon firing.

However, the prior art does not teach a velocity measurement system specifically adapted to measure the velocity of a high speed underwater projectile.

SUMMARY OF THE INVENTION

Therefore it is an object of this invention to provide a device for sensing projectile velocity.

Another object of this invention is to provide a device for sensing projectile velocity in an underwater environment.

Still another object of this invention is to provide a device for sensing projectile velocity in an underwater environment which allows a wide range of movement by the projectile.

A still further object of the invention is to provide circuitry which is an accurate and inexpensive method to measure the velocity of a projectile under the water.

Yet another object of this invention is to provide a device for sensing projectile velocity in an underwater environment which is simple to manufacture and easy to use.

In accordance with one aspect of this invention, there is provided a device for sensing projectile velocity in an underwater environment. The device includes a plurality of evenly spaced voltage coil members positioned in a path of the projectile. Each voltage coil member includes a support member having an opening therein, a voltage coil surrounding the opening of the support member, and a sensing member correspondingly connected to each voltage coil. The sensing member includes means for outputting a signal responsive to the passage of the projectile through the voltage coil member, and a logic arrangement for determining a difference between passage of the projectile between adjacent ones of the plurality of voltage coil members, thereby determining a velocity of the projectile.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a device for sensing a speed of an underwater projectile during underwater testing in the Adaptable High Speed Underwater Munition (AHSUM) project.

Figure 2:
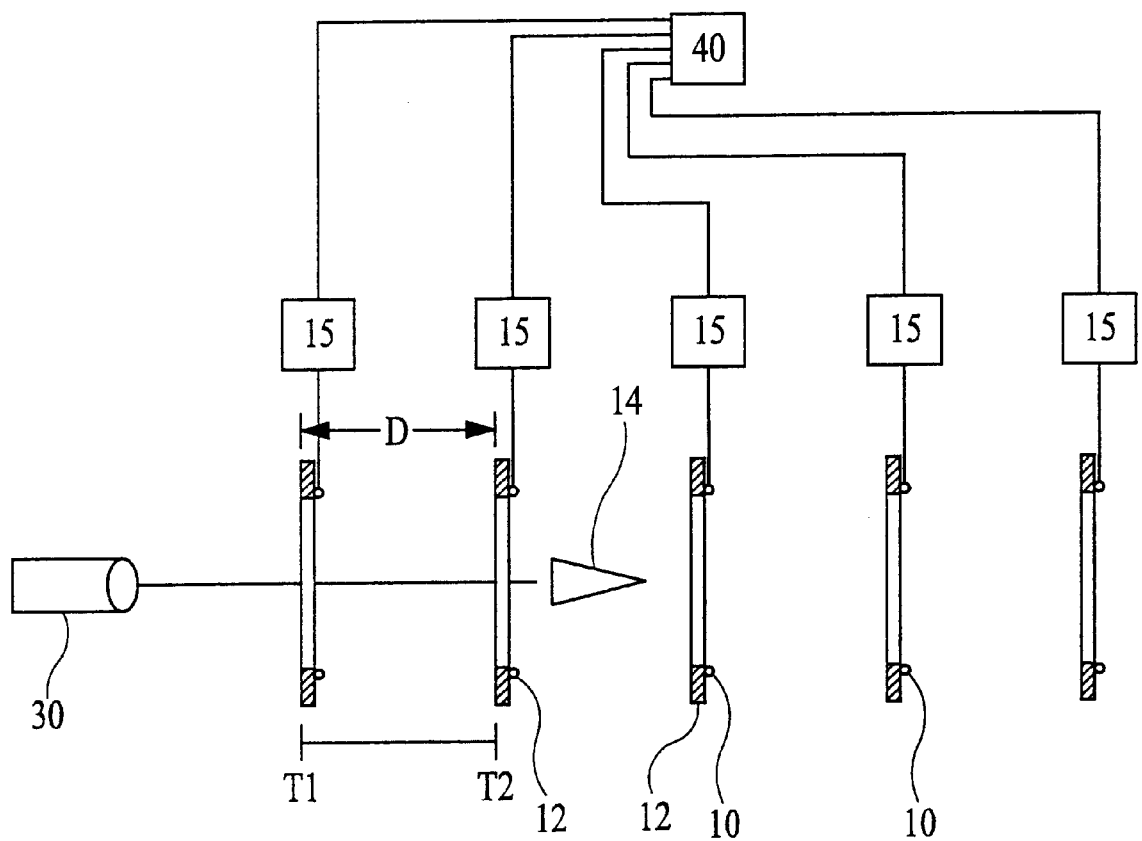
FIG. 2 is a plan view of a series of voltage coils according to the preferred embodiment of the present invention.
Figure 3:
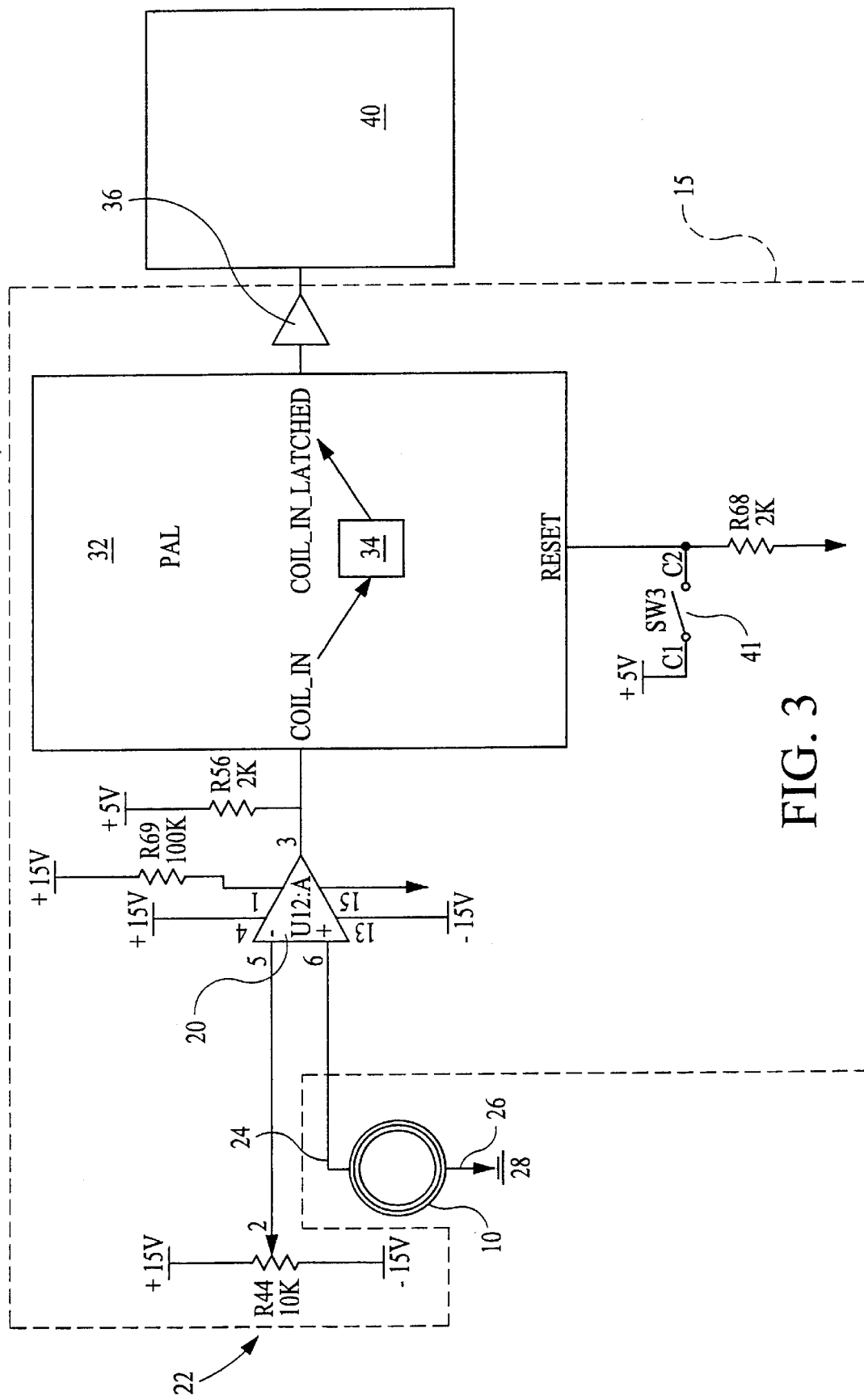
FIG. 3 is a diagrammatic view of the circuitry used in the preferred embodiment of the invention.

The testing utilizes both a series of voltage coils as shown in FIG. 2 and a sensing device used in connection with the series of voltage coils as shown more particularly in FIG. 3.

Referring first to FIG. 2, there is shown a plurality of wire coil members 10. This series of coils 10 each have an inside diameter, for example, of eighteen inches. This diameter is necessary because the projectile 14 path may deflect by nine inches over the length of the range. Each coil 10 is mounted to a steel plate frame 12 having an opening formed therein such that the coil 10 and frame 12 assembly are evenly spaced in the path of an underwater projectile 14 fired from a gun 30. The projectile 14 of this invention contains a magnet for purposes of interacting with the wire coil 10. While non-magnetic projectiles are taught in the prior art, the coils used therein must be much closer to the projectile as compared to that of the present invention. Nearness to the projectile is undesirable in an underwater range because flight of the projectile is less predictable. Accordingly, interaction of an electromagnetic type is utilized in the present invention to enable suitable distancing of the projectile from the coils of the support while increasing detection at required distances.

The opening of the frame 12 may be of any shape suitable for a clean passage of the projectile 14, however, a circular opening was utilized in actual testing of the device. The steel frame 12 is not only used as a fastening surface for the wire coil 10, but as a barricade to protect the surrounding facility and personnel in the event the projectile 14 deflection is greater than anticipated.

Figure 1:
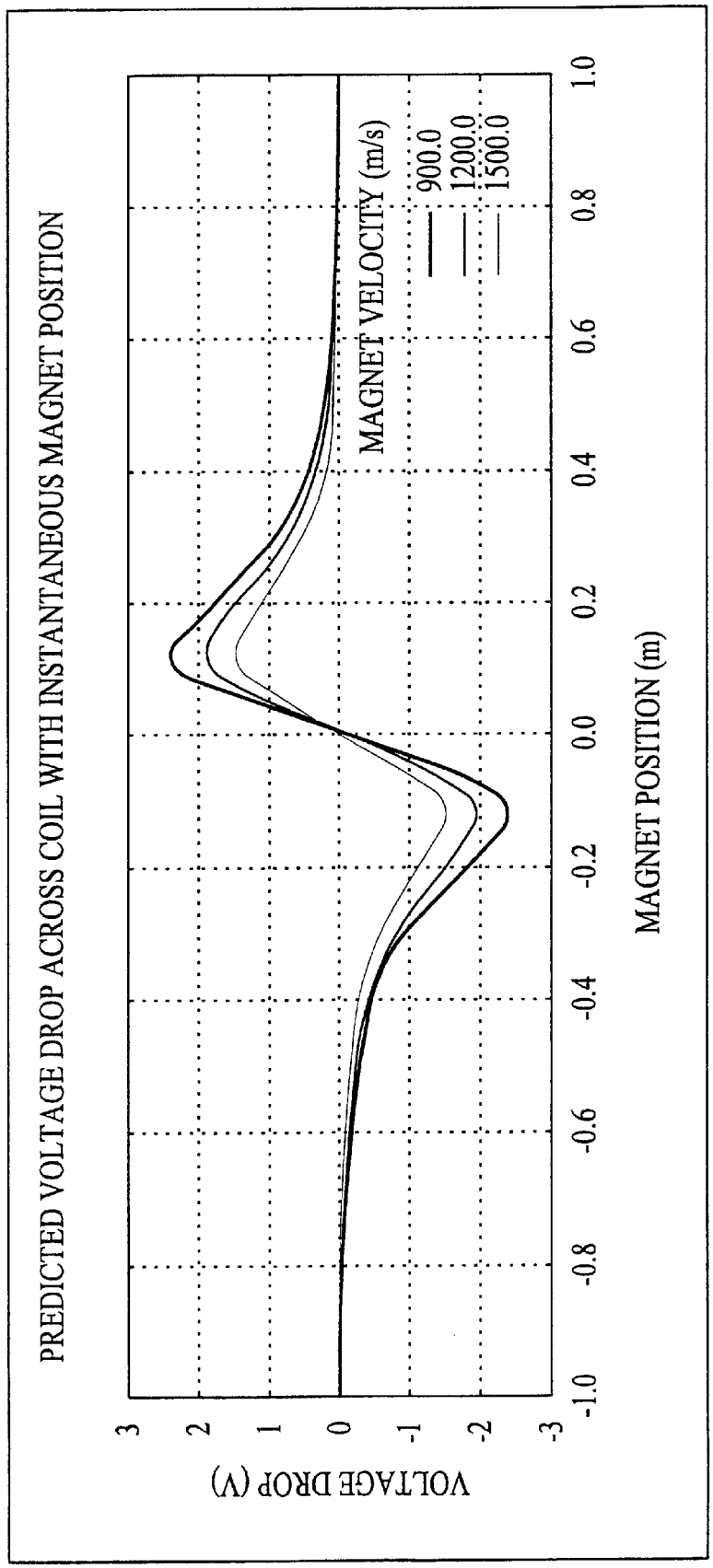
FIG. 1 is a graph of a sample voltage curve according to a preferred embodiment of the present invention.

The wire coil 10 produces a bipolar voltage drop waveform when a projectile 14 having a magnet passes through the coil 10. The amplitude of the voltage waveform depends on the strength of the magnet in the projectile 14, the distance of the projectile 14 from the coil 10, and the speed that the projectile 14 is traveling through the coil 10. A graph of a voltage drop is shown in FIG. 1. Each wire coil 10 is input to a similar one of the control circuit 15 of FIG. 3.

With regard to the arrangement shown in FIG. 1, the device for sensing projectile velocity preferably utilizes a plurality of wire coils 10 set up along the full length of a firing range. It is then possible to measure the time difference between consecutive coil waveforms (between consecutive peaks of the same polarity) on an oscilloscope or high speed data acquisition system 40 in order to calculate projectile velocity.

More specifically, a simple diagram is shown in FIG. 2 showing a series of five wire coils 10, all spaced a predetermined distance D apart. Coils 10 are joined to control circuitry 15. By shooting the projectile 14 through a series of wire coils 10, the test engineers can measure the time interval between consecutive coils 10 in order to measure velocity of the projectile 14. The data acquisition system 40 joined to the control circuitry 15 records the time (T1, T2 . . . ) when projectile 14 passes each coil 10. The velocity of the projectile 14 is ultimately found by measuring the time (T2–T1) to travel the distance D between two consecutive wire coils 10.

Referring now more specifically to the diagram of FIG. 3, there is shown the control circuitry 15 for use in the present invention. The control circuitry 15 processes the state of the wire coils 10.

The first portion of the control circuit 15 contains a voltage comparator 20, for example an LP365A voltage comparator manufactured by National Semiconductor. A negative input of the comparator 20 is connected to a simple potentiometer voltage divider 22 that provides a reference voltage at which an output of the comparator 20 will change state. The voltage divider 22 is joined to a power source 23.

The positive input of the comparator 20 is connected to one lead of the voltage coil 10. The other coil lead 26 is connected to sense circuit ground.

Prior to the projectile 14 passing through the coil 10, the voltage produced by the coil 10 is zero, therefore the comparator 20 outputs a low logical signal (0 Volts). While the projectile 14 magnet is passing through the coil 10, a voltage signal similar to the trace shown in FIG. 1 is produced. When the positive peak of the voltage signal exceeds the reference voltage, the comparator 20 outputs a logical high signal (5 Volts). The output signal of the comparator 20 is input to a programmable array logic device 32 (PAL). The PAL 32 contains discrete logic devices (not shown) that can be programmed and reconfigured.

The signal from the comparator 20 is sent to the clock input of a D-flip-flop 34 that is programmed internally in the PAL 32. The D-input of the flip-flop 34 is permanently connected to a predetermined voltage, such as a logical high voltage (5 Volts). The purpose of the D-flip-flop 34 is to provide a latched logical high signal when a projectile passes through the magnetic coil and prevent an output of the PAL 32 from changing in the event of variations in voltage at the comparator output 20. An output of the flip-flop 34 from the PAL 32 is sent through a buffer 36 such as a 74LS244 buffer manufactured by Texas Instruments which provides the appropriate drive current for the input of data acquisition system 40 and also provides protection to the PAL 32 in the event the output of the PAL 32 is shorted.

The data acquisition system 40 is joined to receive a latched high signal for each of the coil channels from the buffer 36 output associated with each coil 10. As the projectile 14 passes through successive coils 10, the latched signals will be delayed by the projectile's travel time.

As shown in FIG. 2, by subtracting the time between two successive coils 10 of (T2−T1), a velocity can be calculated over a distance (D). This process is repeated over the length of the entire run of coils 10 in order to measure the speed of the projectile from the muzzle of the gun 30 to the end of the test range.

The output of the latch remains high until a reset signal is provided to the PAL 32 via an external reset pulse (5 VDC) to the D-flip-flop reset input that is generated by the activation of a manual switch 41. This reset is normally held low by a pull-down resistor.

The present invention allows for the measurement and calculation of the velocity of a projectile traveling at high rates of speed in an underwater firing range. The use of magnetic coils can be varied by utilizing coils of different designs such as those of a different number of turns, a different diameter and so on. The comparator trigger can be easily modified to meet these alternate coil designs.

Still further, the use of a programmable logic device 32 allows for easy implementation of design logic changes including output polarity and an addition of digital filtering without having to redesign the sensing circuit of the printed circuit board.

Finally, it is anticipated that the invention herein will have far reaching applications other than those of underwater projectile testing projects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A device for sensing projectile velocity comprising:
   a magnetized projectile;
   a plurality of support members positioned in a path of said projectile, and defining an opening at said path;
   a wire coil mounted on said support member, said coil coincident with the opening of said support member;
   a separate sensing circuit connected to each wire coil, each said separate sensing circuit outputting a signal responsive to an electromagnetic interaction generated by passage of said magnetized projectile through said wire coil; and
   a logic arrangement joined to each sensing circuit output.

2. The device according to claim 1 wherein said plurality of support members are positioned a predetermined distance apart.

3. The device according to claim 1 wherein each said separate sensing circuit includes a lead connected to ground and an output.

4. The device according to claim 1 wherein said sensing circuit includes:
   an electrical ground;
   a power source having positive voltage terminal and a negative voltage terminal; and
   each said sensing circuit includes:
      a voltage comparator having positive and negative inputs and an output responsive to said positive and negative inputs;
      a potentiometer voltage divider joined between said positive voltage terminal and said negative voltage terminal connected to the negative input of said voltage comparator; and
      a D-flip-flop having a d input joined to a logical high voltage, a clock input joined to said voltage comparator output and a flip-flop output providing a steady signal in response to said comparator output signal;
      said logic arrangement comprising a data acquisition system joined to receive said steady signal from each of a plurality of D-flip-flop outputs, and determining a difference in a time of projectile passage between any two adjacent ones of said plurality of voltage coil members.

5. The device according to claim 4 wherein said D-flip-flop comprises an internally programmed D-flip-flop in a programmable array logic device.

6. The device according to claim 5 further comprising a buffer member positioned between said programmable array logic device and said data acquisition system.

7. The device according to claim 4 further comprising a buffer member positioned between the latched output of said D-flip-flop output and said data acquisition system.

8. The device according to claim 5 further comprising an external manual switch connected to a reset input of said programmable array logic and internal D-type flip-flop.

9. The device according to claim 8 wherein said reset input returns said latched output signal of said programmable array logic to said power up state of 0 Volts.

10. The device according to claim 1 wherein said device is underwater.

11. A device for sensing projectile velocity comprising:
   a plurality of support members positioned in a path of said projectile, and defining an opening at said path;
   a wire coil mounted on said support member, said coil coincident with the opening of said support member;

a sensing circuit connected to each wire coil, said sensing circuit outputting a signal responsive to passage of said projectile through said wire coil; and a logic arrangement joined to each sensing circuit output, said sensing circuit includes:

an electrical ground;

a power source having positive voltage terminal and a negative voltage terminal;

a voltage comparator having positive and negative inputs and an output responsive to said positive and negative inputs;

a potentiometer voltage divider joined between said positive voltage terminal and said negative voltage terminal connected to the negative input of said voltage comparator; and a D-flip-flop having a d input joined to a logical high voltage, a clock input joined to said voltage comparator output and a flip-flop output providing a steady signal in response to said comparator output signal;

said logic arrangement comprising a data acquisition system joined to receive said steady signal from each of a plurality of D-flip-flop outputs, and determining a difference in a time of projectile passage between any two adjacent ones of said plurality of voltage coil members.

12. The device according to claim 11 wherein said plurality of support members are positioned a predetermined distance apart.

13. The device according to claim 11 wherein said sensing circuit includes a lead connected to ground and an output.

14. The device according to claim 11 wherein said D-flip-flop comprises an internally programmed D-flip-flop in a programmable array logic device.

15. The device according to claim 14 further comprising a buffer member positioned between said programmable array logic device and said data acquisition system.

16. The device according to claim 14 further comprising an external manual switch connected to a reset input of said programmable array logic and internal D-type flip-flop.

17. The device according to claim 16 wherein said reset input returns said latched output signal of said programmable array logic to said power up state of 0 Volts.

18. The device according to claim 11 further comprising a buffer member positioned between the latched output of said D-flip-flop output and said data acquisition system.

19. The device according to claim 11 wherein said device is underwater.

* * * * *